US006336251B1

(12) United States Patent
Sartor

(10) Patent No.: US 6,336,251 B1
(45) Date of Patent: Jan. 8, 2002

(54) ELASTIC HINGE FOR EYEGLASSES

(75) Inventor: Rino Sartor, Montebelluna (IT)

(73) Assignee: Celes Optical S.r.l., Pederobba (IT)

( * ) Notice: Subject to any disclaimer, the term of this patent is extended or adjusted under 35 U.S.C. 154(b) by 0 days.

(21) Appl. No.: 09/463,343

(22) PCT Filed: May 25, 1999

(86) PCT No.: PCT/EP99/03555

§ 371 Date: Jan. 24, 2000

§ 102(e) Date: Jan. 24, 2000

(87) PCT Pub. No.: WO99/61951

PCT Pub. Date: Dec. 2, 1999

(30) Foreign Application Priority Data

May 28, 1998 (IT) ........................................ PD98A0133

(51) Int. Cl.⁷ ................................................ G02C 5/22
(52) U.S. Cl. ........................................ 16/228; 351/113
(58) Field of Search ........................ 16/228, 285, 286; 351/111–114, 119, 121, 153

(56) References Cited

U.S. PATENT DOCUMENTS

| 4,351,086 A | * | 9/1982 | Drlik | 16/228 |
|---|---|---|---|---|
| 4,617,698 A | * | 10/1986 | Drlik | 16/228 |
| 4,818,093 A | * | 4/1989 | Tabacchi | 16/228 |
| 4,932,771 A | * | 6/1990 | Nowottny | 351/113 |
| 5,018,242 A | * | 5/1991 | Guy et al. | 351/113 |
| 5,483,302 A | * | 1/1996 | Jaffelin | 351/113 |
| 5,760,869 A | * | 6/1998 | Mitamura | 351/153 |
| 6,152,562 A | * | 11/2000 | Montalban | 351/153 |

FOREIGN PATENT DOCUMENTS

| DE | A-195 11167 | 10/1996 |
|---|---|---|
| EP | A-0 207190 | 1/1987 |
| EP | A-0652 456 | 5/1995 |
| EP | A-0 880 045 | 11/1998 |
| WO | A-97 32234 | 9/1997 |
| WO | A-97 45763 | 12/1997 |

\* cited by examiner

*Primary Examiner*—Chuck Y. Mah
(74) *Attorney, Agent, or Firm*—Guido Modiano; Albert Josif; Daniel O'Byrne

(57) ABSTRACT

An elastic hinge for eyeglasses, comprising a temple which has an end provided with a hollow body which accommodates, with a coupling which allows only rotation, part of a tubular element in which one end of a shaped element is guided with a coupling which allows only sliding. The shaped element has, at the other end, an eyelet which is inserted between two other eyelets which are fixed to the front of the eyeglasses so as to form the articulation of the hinge. A single spring is fixed with a first end to a part of the shaped element located inside the tubular element, with a second end to the hollow body and with a portion, which is intermediate between the first and second ends, to the tubular element.

11 Claims, 3 Drawing Sheets

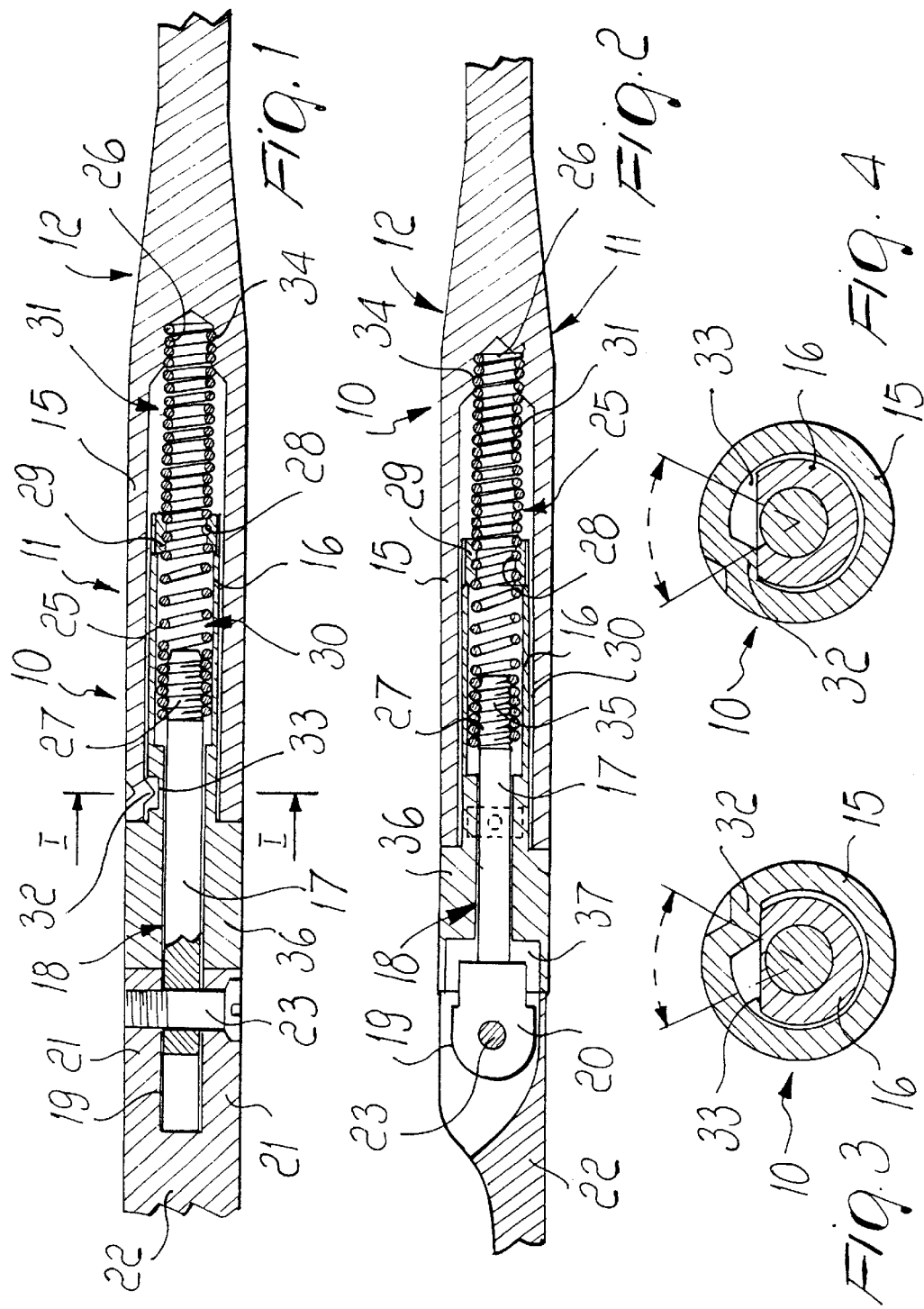

ELASTIC HINGE FOR EYEGLASSES

BACKGROUND OF THE INVENTION

The present invention relates to an elastic hinge for eyeglasses.

The market currently requires elastic hinges for eyeglasses to allow perfect adaptation of the eyeglasses to the head of the user without any discomfort to the user.

In particular, it is necessary to combine a highly stable positioning of the eyeglasses with an equally highly delicate resting of the eyeglasses against the user's skin.

Currently commercially available elastic hinges for eyeglasses substantially comprise, at the end of a temple, an elongated hollow body with a flat end which contains a spring arranged between the head of a pivot which passes through it together with a contrast element which is locked in said body.

The pivot, by means of the contrast element, engages therein with a first hinge element, which is in turn pivoted to a second hinge element which is fixed to the front of the eyeglasses.

The second hinge element usually has a polygonal profile in order to define one or more stable operating positions of the eyeglasses.

The components of conventional hinges allow them substantially to be elastic as regards extra-wide opening, which is now commonly provided, in order to both better adapt the fit of the eyeglasses and prevent forces applied to the hinge by the user from damaging its functionality prematurely.

However, fit analysis has shown that it is particularly important for hinges to also allow a preset torsional stroke of the temple with respect to the front of the eyeglasses.

In order to achieve this function, various constructive solutions provide for the addition of one or more elastic elements which are connected to stroke limiting or articulation means, which are meant to allow a connection which can yield elastically and torsionally over a limited stroke of the temple with respect to the front of the eyeglasses.

However, the solutions that have been proposed so far have proved themselves less than fully satisfactory from the point of view of fit.

In particular, a certain concentration (usually in two points) of the load of the temples on the user's head, consequently generating possible discomfort for the user, has not been eliminated up to now.

SUMMARY OF THE INVENTION

The aim of the present invention is to provide an elastic hinge for eyeglasses which solves the above-mentioned drawbacks of conventional models, allowing not only stability of the working positions and of the extra-wide opening but also a torsional movement.

The torsional movement, in particular, must provide for a limited stroke, within a preset limit, of the temple with respect to the front of the eyeglasses, with a consequent resting contact of the temple in at least four points in order to ensure both that the eyeglasses will not move and that the pressure forces are adequately distributed on the head of the user.

Another object of the present invention is to provide an elastic hinge which is particularly strong notwithstanding its substantial constructive simplicity.

Another object of the present invention is to provide an elastic hinge having a reduced number of components.

Another object of the present invention is to provide an elastic hinge whose production costs are competitive with respect to conventional hinges having the same functions.

Another object of the present invention is to provide an elastic hinge which can be manufactured with conventional technologies and equipment.

This aim, these objects and others which will become apparent hereinafter are achieved by an elastic hinge for eyeglasses, characterized in that it comprises a temple which has an end provided with a hollow body which accommodates, with a coupling which allows only rotation, part of a tubular element in which one end of a shaped element is guided with a coupling which allows only sliding, said shaped element forming, at the other end, an eyelet which is inserted between two other eyelets which are fixed to the front of the eyeglasses so as to form the articulation of said hinge, a single spring being fixed with a first end to a part of said shaped element located inside said tubular element, with a second end to said hollow body and with a portion, which is intermediate between said first and second ends, to said tubular element.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIG. 1 is a sectional view of an elastic hinge according to the invention;

FIG. 2 is another sectional view of the hinge of FIG. 1;

FIGS. 3 and 4 are further sectional views, taken along the plane I-I, of the hinge of FIG. 1 in two different operating steps;

DESCRIPTION OF THE PREFERRED EMBODIMENTS

Figure 5:
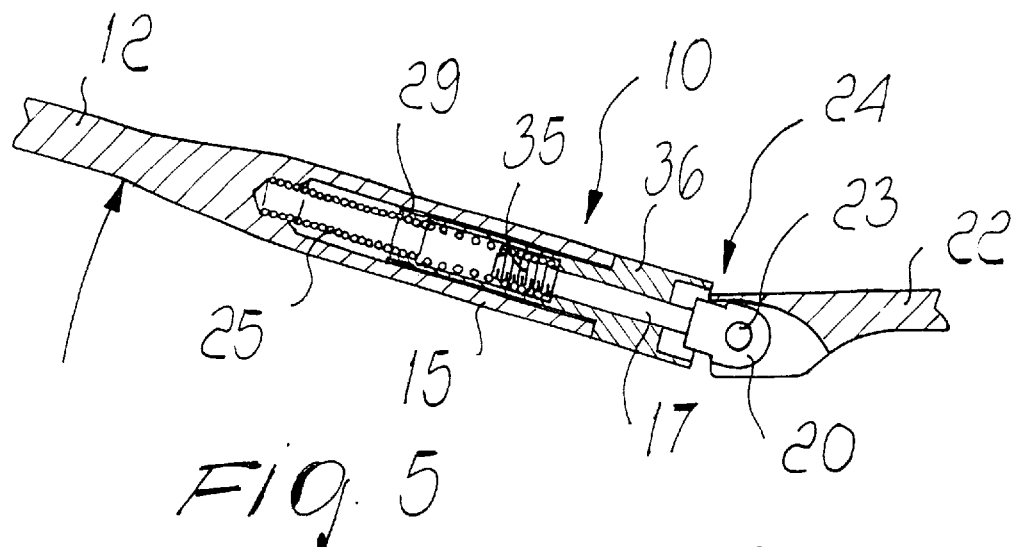
FIGS. 5 to 7 are sectional views of the hinge of FIG. 1 in various operating steps.
Figure 6:
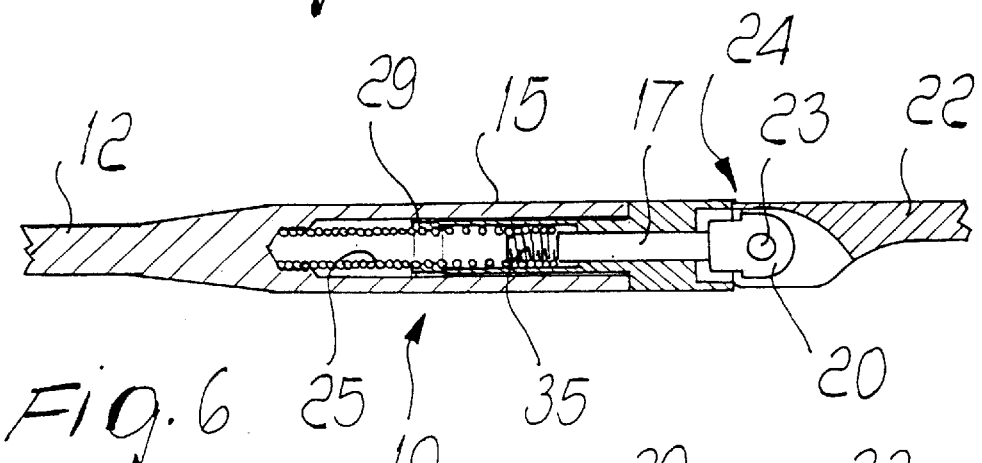
Figure 7:
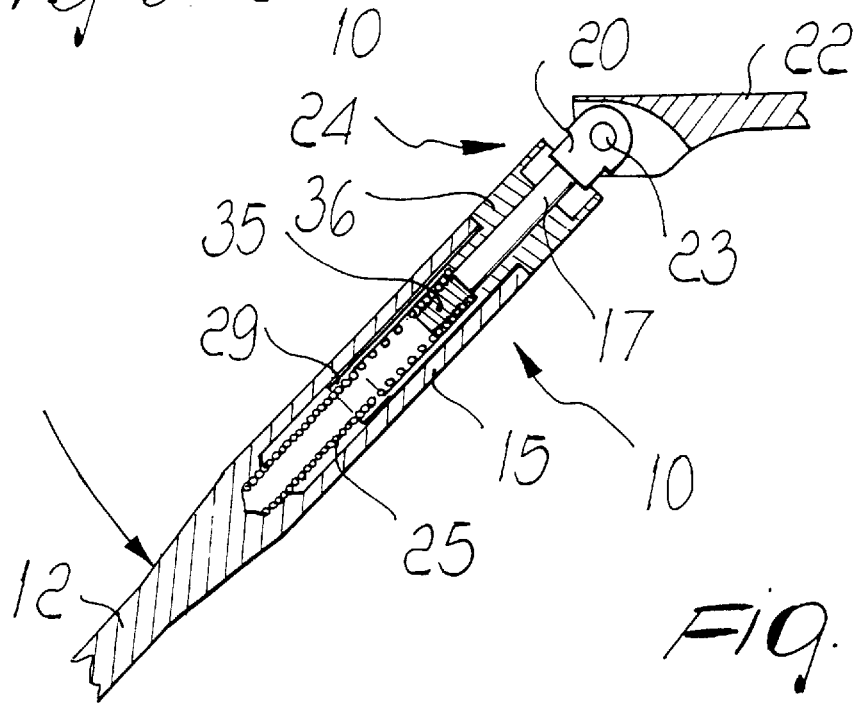
Figure 10:
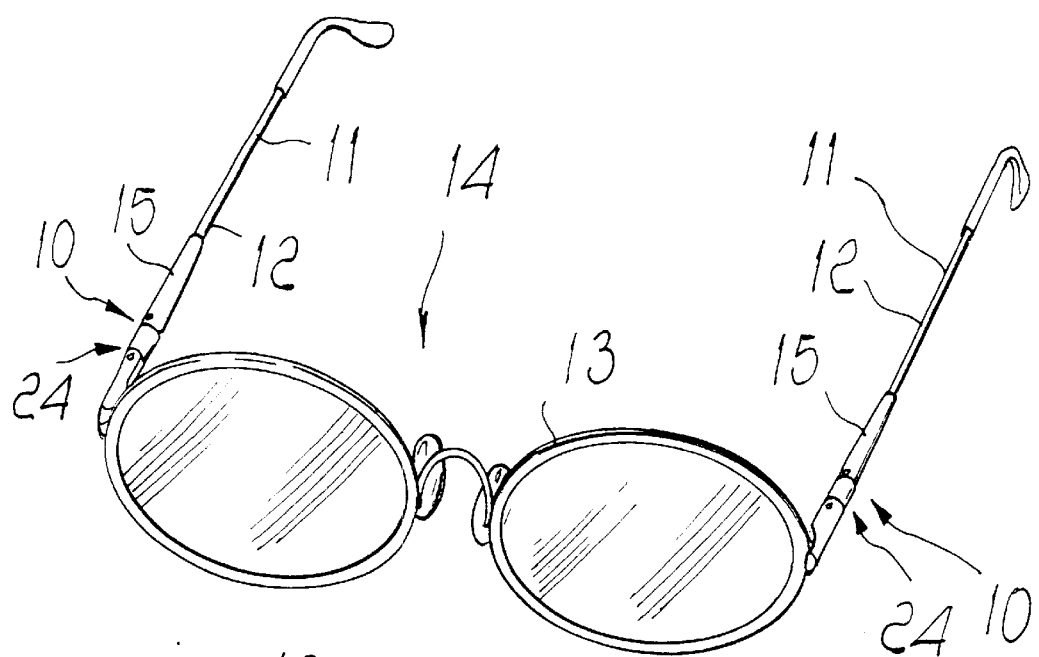
FIG. 10 is a perspective view of two hinges which are similar to those of FIG. 1, assembled to a front.
Figure 8:
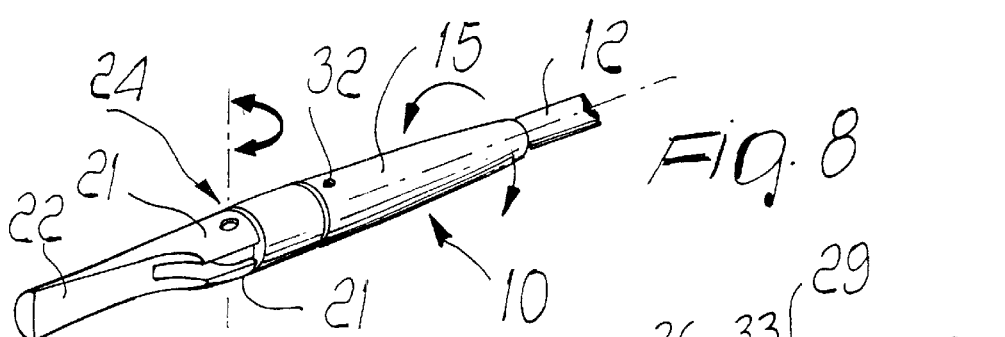
FIG. 8 is a perspective view of part of the hinge of FIG. 1.
Figure 9:
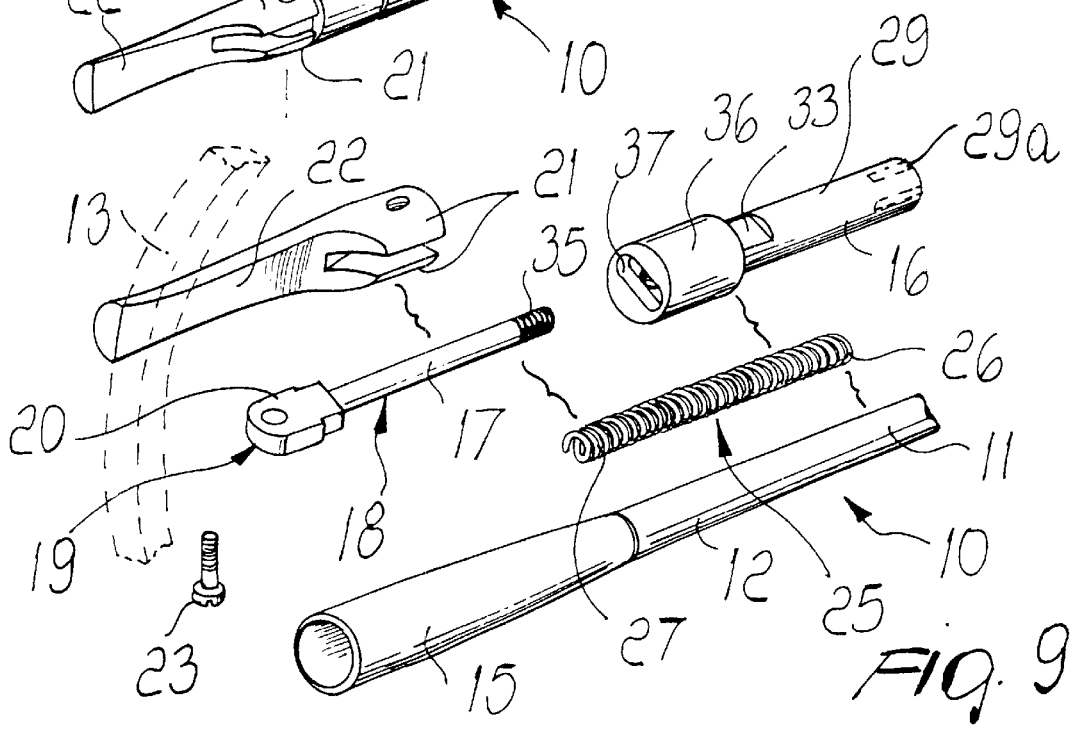
FIG. 9 is an exploded perspective view of the hinge of FIG. 1.

With particular reference to FIGS. 1 to 10, an elastic hinge for eyeglasses according to the invention is generally designated by the reference numeral 10.

In particular, the hinge 10 comprises a temple 11 which has an end 12 which is directed toward the front 13 of the eyeglasses, which are generally designated by the reference numeral 14.

The end 12 has a hollow body 15 in which a part 29 of a tubular element 16 is accommodated.

In turn, said tubular element accommodates a pivot-like end 17 of a shaped element 18 which has, at the other end 19, an eyelet 20 which is inserted, upon assembly, between two other eyelets 21 which protrude from a component 22 which is rigidly coupled to the front 13 of the eyeglasses 14.

It is important to stress the fact that the pivot-like end 17 of the shaped element 18 has reduced dimensions with respect to the tubular element 16 in which it is inserted.

The tubular element 16 has, at the outer end designated by the reference numeral 36, a seat 37 which is shaped complementarily to the eyelet 20 of the shaped element 18 in order to accommodate its insertion.

In this manner, the shaped element 18 is affected by a coupling which allows it only to slide inside the tubular element 16 and does not allow it to perform any rotation.

The eyelet 20 and the eyelets 21 are crossed by a threaded element 23, so as to provide the articulation 24 of the hinge 10.

The hinge 10 comprises a helical spring 25 which is inserted in the tubular element 16 and is interposed between the shaped element 18 and the bottom of the hollow body 15.

In particular, the spring 25 has a first end 26 which is fixed at the internal surface of the hollow body 15 and a second end 27 which is fixed to the end 17 of the shaped element 18, as described in greater detail hereinafter.

In this embodiment, the spring 25 is further locked, at its substantially median region 28, to an end 29a of the part 29 of the tubular element 16.

The spring 25 is suitable to ensure the elastic contrast required for the stable working positions for extra-wide opening and for the torsional adaptation movement of the temple 11 with respect to the front 13.

More specifically, the locking of the spring 25 in a median region 28 forms thereon two sections which are designated by the reference numerals 30 and 31 respectively; the section related to the element 18 is preloaded by traction.

The hinge 10 also comprises stroke limiter means for the torsional adaptation movement of the temple 11 with respect to the front 13; such means are constituted by a stud which is formed on the outer surface of the hollow body 15 so as to obtain a raised portion 32 on the internal surface thereof at a flat region 33 formed on the outer surface of the part 29 of the tubular element 16.

The flat region 33 determines the maximum angular stroke allowed to the raised portion 32 and therefore to the temple 11 in its adaptation movement.

In this manner, the hollow body 15 can only rotate with respect to the tubular element 16, since any axial translatory motion thereof is prevented indeed because of the presence of the raised portion 32 in the flat region 33.

The placement of the raised portion 32 in the flat region 33 simultaneously also sets the maximum rotation allowed to the hollow body 15 and therefore sets the degree of maximum torsion of the temple 11 with respect to the front 13.

The internal end surface of the hollow body 15 is shaped so as to form a female thread 34 for association with the corresponding first end 26 of the spring 25.

The pivot-like end 17 of the shaped element 18 has, in its end portion, a threaded region 35 for coupling to the corresponding second end 27 of the spring 25.

Moreover, the median region 28 of the spring 25 is fixed to the part 29 of the tubular element 16 by plastic deformation of the end 29a thereof.

In practice it has been observed that the present invention has achieved the intended aim and objects.

In particular, it should be noted that the structure and the arrangement of the components of the hinge according to the invention allows to provide not only stable positions and the extra-wide opening of the temple but also the torsional adaptation movement of said temple with respect to the front of the eyeglasses.

One portion of the spring 25 in fact works in contrast with the pivot-like end 17 of the shaped element 18, so as to allow the temple 11 to achieve extra-wide opening, while the remaining part, in a substantially independent manner, allows the torsion of said temple 11.

In particular, the purely sliding movement performed by the shaped element 18 with respect to the tubular element 16 is separate from the movement of the hollow body 15 with respect to said tubular element 16, which is a pure rotation.

In particular, the structure of the hinge according to the invention allows resting against four points with respect to the head of the user, thus ensuring, in addition to perfect stability of the fit of the eyeglasses, a better distribution of the pressure forces of the temples on the head of the user, with a consequent reduction, and possible elimination, of discomfort in wearing said eyeglasses.

It should also be noted that the hinge according to the invention is particularly simple in structure and requires a limited number of components which are easy to assemble.

Accordingly, the hinge according to the invention can be manufactured with times and costs which are competitive with respect to conventional hinges having the same functions.

The present invention is susceptible of numerous modifications and variations, all of which are within the scope of the inventive concept.

The materials and the dimensions may be any according to requirements.

The technical details may also be replaced with other technically equivalent elements.

The disclosures in Italian Patent Application No. PD98A000133 from which this application claims priority are incorporated herein by reference.

What is claimed is:

1. An elastic hinge in a pair of eyeglasses, comprising:
   a front;
   a temple which has an end provided with an internal hollow body;
   a shaped element having an eyelet which is inserted between two other eyelets which are fixed to the front of the eyeglasses so as to form an articulation of said hinge;
   an internally hollow tubular element which has a longitudinal axis and which is inserted inside said hollow body of said temple such that said tubular element is rotatable with respect to said hollow body inside said hollow body substantially about said longitudinal axis of said tubular element and such said tubular element is substantially prevented from sliding relative to said hollow body in a direction of extension of said longitudinal axis of said tubular element, and said shaped element being inserted inside said tubular element such that said shaped element is substantially prevented from rotating with respect to sad tubular element about said longitudinal axis of said tubular element and such that said shaped element is free to slide relative to said tubular element substantially in the direction of extention of said longitudinal axis of said tubular element;
   a single spring inserted inside said tubular element and inside said hollow body, said spring having a first end which is fixed to a part of said shaped element located inside said tubular element, and said spring having a second end which is fixed to said hollow body, and said spring having an intermediate portion which is arranged between said first and second ends and which is fixed to said tubular element.

2. The hinge in the eyeglasses according to claim 1, wherein said tubular element has an external end which is arranged outside said hollow body, said external end of said tubular element having a hollow seat in which said eyelet of said shaped element is inserted and which is shaped complementarily to the eyelet of said shaped element so that said shaped element is substantially prevented from rotating with respect to said tubular element about said longitudinal axis of said tubular element and such that said shaped element is free to slide relative to said tubular element substantially in the direction of extension of said longidinal axis of said tubular element.

3. The hinge in the eyeglasses according to claim 2, wherein said shaped element has a pivot which extends from said eyelet of said shaped element and is arranged inside said tubular element, said first end of said spring being fixed to a free end of said pivot of said shaped element.

4. The hinge in the eyeglasses according to claim 3, wherein said free end of said pivot of said shaped element has a threaded end part for mating with the corresponding first end of said spring.

5. The hinge in the eyeglasses according to claim 4, wherein an internal end surface of the hollow body is shaped so as to form a female thread for connection with the corresponding second end of the spring.

6. The hinge in the eyeglasses according to claim 2, further comprising stroke limiting means for a torsional adaptation movement of said temple with respect to said front.

7. The hinge in the eyeglasses according to claim 6, wherein said stroke limiting means are constituted by a raised portion which is formed on an internal surface of said hollow body at a flat region formed on an outer surface of said tubular element that lies inside said hollow body, said flat region determining a maximum angular stroke allowed of said temple relative to said front by abutment of said raised portion with said flat region.

8. The hinge in the eyeglasses according to claim 7, wherein said raised portion formed at said flat region is configured such that said tubular element is substantially prevented from sliding relative to said hollow body in the direction of extension of said longitudinal axis of said tubular element.

9. The hinge in the eyeglasses according to claim 7, wherein said raised portion formed on the internal surface of the hollow body is formed by means of a stud on a corresponding outer surface of said hollow body.

10. The hinge in the eyeglasses according to claim 1, wherein said intermediate portion of said spring is fixed to a free end of said tubular element arranged inside said hollow body by plastic deformation of said free end of said tubular element.

11. The hinge in the eyeglasses according to claim 10, wherein a locking of the intermediate portion of said spring with said free end of said tubular element forms two sections of said spring, wherein a first section of said spring connected to said shaped element is pre-loaded by traction.

* * * * *